US011269622B2

(12) United States Patent
Alam et al.

(10) Patent No.: US 11,269,622 B2
(45) Date of Patent: Mar. 8, 2022

(54) METHODS, SYSTEMS, ARTICLES OF MANUFACTURE, AND APPARATUS FOR A CONTEXT AND COMPLEXITY-AWARE RECOMMENDATION SYSTEM FOR IMPROVED SOFTWARE DEVELOPMENT EFFICIENCY

(71) Applicant: Intel Corporation, Santa Clara, CA (US)

(72) Inventors: Mohammad Mejbah Ul Alam, Milpitas, CA (US); David I. Gonzalez Aguirre, Hillsboro, OR (US); Shengtian Zhou, Palo Alto, CA (US); Justin Gottschlich, Santa Clara, CA (US); Li Chen, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 16 days.

(21) Appl. No.: 16/457,006

(22) Filed: Jun. 28, 2019

(65) Prior Publication Data
US 2019/0324744 A1 Oct. 24, 2019

(51) Int. Cl.
*G06F 8/71* (2018.01)
*G06F 8/75* (2018.01)
(Continued)

(52) U.S. Cl.
CPC .............. *G06F 8/71* (2013.01); *G06F 8/75* (2013.01); *G06F 8/77* (2013.01); *G06F 16/906* (2019.01);
(Continued)

(58) Field of Classification Search
CPC ... G06F 40/40; G06F 8/71; G06F 8/75; G06F 8/77; G06F 17/11; G06F 16/906; G06F 16/9035; G06N 3/0418
(Continued)

(56) References Cited

U.S. PATENT DOCUMENTS 10,169,567 B1 * 1/2019 Pentz ................... G06F 21/6218
10,764,534 B1 * 9/2020 Shevchenko ........... G06F 9/453
(Continued)

OTHER PUBLICATIONS

Park et al. "The design of polynomial function-based neural network predictors for detection of software defects", retrieved from Information Sciences, 2013, pp. 40-57. (Year: 2013).*
(Continued)

*Primary Examiner* — Marina Lee
(74) *Attorney, Agent, or Firm* — Hanley, Flight & Zimmerman, LLC

(57) ABSTRACT

Apparatus, systems, articles of manufacture, and methods for a context and complexity-aware recommendation system for efficient software development. An example apparatus includes a current state generator to generate a representation of a current state of a new function, an instruction predictor to generate a first recommended software component based on the current state of the new function, a complexity cost determiner to rank the first recommended software component based on a weighted sum of associated partial cost values, the software component to be ranked against second recommended software components based on a comparison of partial cost values corresponding to respective ones of the second recommended software components, a risk identifier to detect vulnerabilities based on an attack surface of a portion of the first recommended software component, and a ranking determiner to generate a third recommended software component, the third recommended software component corresponding to respective ranking metrics.

21 Claims, 8 Drawing Sheets

(51) Int. Cl.
G06F 8/77 (2018.01)
G06F 17/11 (2006.01)
G06F 40/40 (2020.01)
G06F 16/906 (2019.01)
G06F 16/9035 (2019.01)
G06N 3/04 (2006.01)

(52) U.S. Cl.
CPC .......... G06F 16/9035 (2019.01); G06F 17/11 (2013.01); G06F 40/40 (2020.01); G06N 3/0418 (2013.01)

(58) Field of Classification Search
USPC .................................................. 717/120–135
See application file for complete search history.

(56) References Cited

U.S. PATENT DOCUMENTS

| | | | | |
|---|---|---|---|---|
| 2011/0067009 | A1* | 3/2011 | Hosokawa .......... | G06F 11/3604 717/132 |
| 2012/0311534 | A1* | 12/2012 | Fox .......................... | G06F 8/36 717/120 |
| 2016/0110549 | A1* | 4/2016 | Schmitt ..................... | G06F 8/43 726/25 |
| 2018/0204111 | A1* | 7/2018 | Zadeh .................. | G06K 9/3233 |
| 2019/0050942 | A1* | 2/2019 | Dalal .................... | G06N 3/0454 |
| 2019/0244609 | A1* | 8/2019 | Olabiyi ................. | G10L 13/027 |
| 2019/0273510 | A1* | 9/2019 | Elkind ..................... | G06F 8/74 |

OTHER PUBLICATIONS

Lucas Kanashiro et al. "A Study on Low Complexity Models to Predict Flaws in the Linux Source Code" @ 2017 AISTI, total pages: 7 pages. (Year: 2017).*
Mikolov et al., "Efficient Estimation of Word Representations in Vector Space," Sep. 2013, 12 pages.
Ben-Nun et al., "Neural Code Comprehension: A Learnable Representation of Code Semantics," Dec. 2018 32nd Conference on Neural Information Processing Systems (NeurIPS 2018), 17 pages.
Chen et al., "Towards resilient machine learning for ransomware detection," Dec. 2018, 10 pages.
Sutskever et al. "Sequence to sequence learning with neural networks," in NIPS, Sep. 2014, https://papers.nips.cc/paper/5346-sequence-to-sequence-learning-with-neural-networks.pdf, (pp. 3104-3112), 9 pages).
Peterson, James L. "Computer programs for detecting and correcting spelling errors," Communications ACM 23, 12, Dec. 1980, (pp. 679-687), 12 pages.
Bruch et al. "Learning from examples to improve code completion systems," in Proceedings of the 7th joint meeting of the European software engineering conference and the ACM SIGSOFT symposium on the Foundations of Software Engineering, Aug. 2009, https://doi.org/10.1145/1595696.1595728 (pp. 213-222), 1 page. (Abstract only provided).
Holmes, Reid and Bengel, Andrew. "Deep Intellisense: a tool for rehydrating evaporated information", in proceedings of the 2008 international working conference on Mining software repositories, May 2008, https://dl.acm.org/citation.cfm?id=1370755, 1 page. (Abstract only provided).
Pennington et al. "Glove: Global Vectors for Word Representation", Stanford University, Aug. 2014 (12 pages).
"Common Vulnerabilities and Exposures," Online: <https://cve.mitre.org>, accessed via <https://web.archive.org/web/20190621003235/https://cve.mitre.org/> on Nov. 7, 2019 (1 page).
"Juliet 1.3 Test Suite," Online: <https://samate.nist.gov/SARD/testsuite.php>, Nov. 2017 (8 pages).
"Ros-Industrial," Online: <https://rosindustrial.org/> Nov. 2019, accessed via <https://web.archive.org/web/20190607010132/https://rosindustrial.org/> Jun. 7, 2019 (4 pages).
Wikipedia, "Sorting Algorithm," Online: <https://en.wikipedia.org/wiki/Sorting_algorithm>, Jun. 13, 2019, accessed via <https://web.archive.org/web/20190613015115/https://en.wikipedia.org/wiki/Sorting_algorithm> on Nov. 7, 2019 (13 pages).
Wikipedia, "Intelligent Code Completion," Online: <https://en.wikipedia.org/wiki/Intelligent_code_completion>, Jun. 20, 2019, accessed via <https://web.archive.org/web/20190620232817/https://en.wikipedia.org/wiki/Intelligent_code_completion> on Nov. 7, 2019 (5 pages).
Cmake, Online: <https://cmake.org/>, Jun. 22, 2019, accessed via <https://web.archive.org/web/20190622235745/https://cmake.org/> on Nov. 8, 2019 (9 pages).
Qt Documentation Archives, Online: <https://doc.qt.io/archives/qt-4.8/qmake-project-files.html>, Apr. 1, 2019, accessed via <https://web.archive.org/web/20190126230053/http://doc.qt.io/archives/qt-4.8/qmake-project-files.html> on Nov. 8, 2019 (10 pages).
Python, "Chapter 6. Modules," Online: <https://docs.python.org/3/tutorial/modules.html>, Jun. 10, 2019, accessed via <https://web.archive.org/web/20190610091529/https://docs.python.org/3/tutorial/modules.html> on Nov. 8, 2019 (10 pages).
Ubuntu, "Personal Package Archives for Ubuntu," Online: <https://launchpad.net/ubuntu/+ppas>, Jun. 5, 2019, accessed via <https://web.archive.org/web/20190605103411/https://launchpad.net/ubuntu/+ppas> on Nov. 8, 2019 (2 pages).
Doxygen, <Online: http://www.doxygen.nl>, Jun. 22, 2019, accessed via <https://web.archive.org/web/20190622210322/http://www.doxygen.nl/> on Nov. 8, 2019 (1 page).
Wikipedia, "Merge Sort," Online: <https://en.wikipedia.org/wiki/Merge_sort>, Jun. 13, 2019, accessed via <https://web.archive.org/web/20190613014533/https://en.wikipedia.org/wiki/Merge_sort> on Nov. 8, 2019 (10 pages).
Wikipedia, "Cubesort," Online: <https://en.wikipedia.org/wiki/Cubesort>, Mar. 30, 2019, accessed via <https://web.archive.org/web/20190330184926/https://en.wikipedia.org/wiki/Cubesort> on Nov. 8, 2019 (1 page).
Wikipedia, "Timsort," Online: <https://en.wikipedia.org/wiki/Timsort>, Jun. 20, 2019, accessed via <https://web.archive.org/web/20190620101129/https://en.wikipedia.org/wiki/Timsort> on Nov. 8, 2019 (6 pages).
Gottschlich et al., "The Three Pillars of Machine Programming," Jun. 2018, Intel Labs, MIT, 11 pages.

* cited by examiner

METHODS, SYSTEMS, ARTICLES OF MANUFACTURE, AND APPARATUS FOR A CONTEXT AND COMPLEXITY-AWARE RECOMMENDATION SYSTEM FOR IMPROVED SOFTWARE DEVELOPMENT EFFICIENCY

FIELD OF THE DISCLOSURE

This disclosure relates generally to software development, and, more particularly, to systems, apparatus, articles of manufacture, and methods for a context and complexity-aware recommendation system for improved software development efficiency.

BACKGROUND

Software development relies on computer science-related processes used for the purposes of creating, designing, deploying, and supporting software. While software development includes writing and maintaining source code, such development encompasses a broader life cycle, including starting steps of conceiving a software prototype up to a final developed software product. Still further, such software development includes modifications, re-development, and research to bring the initial software product concept to completion.

BRIEF DESCRIPTION OF THE DRAWINGS

In general, the same reference numbers will be used throughout the drawing(s) and accompanying written description to refer to the same or like parts.

DETAILED DESCRIPTION

Figure 1A:
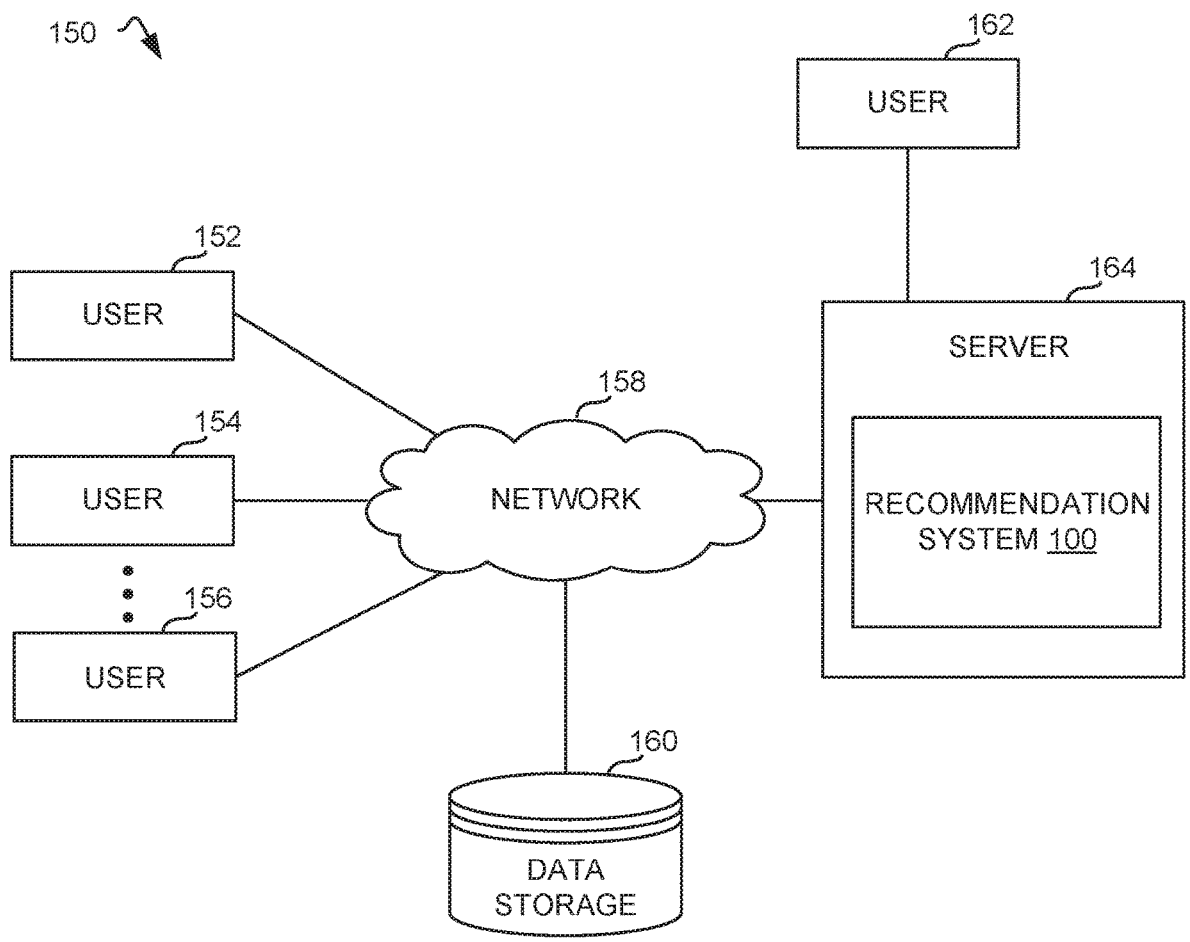
FIG. 1A is a block diagram illustrating an example environment in which a context and complexity-aware recommendation system is implemented.

Software development is a human-machine cyclical, incremental process. A software developer can employ existing external functionality as a substantial part of each software project. Thus, the developer invests significant amounts of time for acquiring knowledge about an existing code base. A code base is a collection of source code used to build a particular software system, application, or software component. Code bases include, but are not limited to, Software Development Kits (SDKs), Application Programming Interfaces (APIs), and Middlewares, among others. For example, SDKs allow the construction of applications for a specific package, framework, hardware, operation system, etc. APIs provide routines, protocols, and tools for building software. While SDKs include resident processes, services or daemons playing dynamic execution rolls of routines and library procedures, APIs are only code and compiled libraries. Developers can use code bases to modify and/or include functionality in each new or legacy project. As software requirements, computational devices and features evolve over time, the inclusion and removal of such external software dependencies implies continuous learning of the morphing and/or otherwise dynamic code base.

Developers have access to a plethora of auto-completion tools for software development. These auto-completion tools are usually native to a particular Integrated Developing Environment (IDE) (e.g., Eclipse®, NetBeans®, Wing IDE®, etc.) and programming language (e.g., C, C++, Java®, Pascal, etc.). These tools and their underlying technologies can be solely focused on providing spell checking, syntax completion and style formatting based on the analysis of the Local Active Context (LAC), permitting active compilation and/or linking of a set of libraries and directories. However, existing IDEs and tools do not suggest additional libraries, modules or functions to the users beyond those already available in their LAC. Likewise, these tools do not provide explicit presentation and ranking of the software inclusion(s) (e.g., SDKs. APIs, etc.) to assist developers in selecting specific routines, modules, and libraries based on a set of ranking metrics.

Current software development tools are limited to lexical and syntax-centric constraints, active-context limitations, and exhibit suboptimal product development experiences for developers. For example, existing techniques to aid developers during the software development cycle are limited to the analysis, correction and suggestion relaying on the two first fundamental levels of the language translation process, namely the lexical and syntactical analysis. Lexical analysis is used in this context to correct spellings and manage the token's distribution and formation. For example, during lexical analysis, a lexical analyzer reads the source code to be compiled and produces a list of tokens, while a parser can take this list of tokens and produce a data structure that represents a program. Syntactical analysis is used herein to suggest code snippets to auto-complete control structures such as if, else, while, etc. Some helpful features of known techniques include presentation of rapid visualization and indexation of local contextually-active (e.g., hiding non-constant calls for constant instances) methods or member variables depending on the immediately typed entity or addressed (pointer, reference, etc.) entity. Furthermore, traditional hybrid lexical and semantic analysis can be used to provide source code styling format subject to validation of language constraints to ensure compatibility of style and syntaxes of diverse languages. Typical combined analysis can include tabulation in C/C++ versus tabulation in Python, which cannot be handled in the same manner. However, there is no exploitation of semantics in such traditional techniques to suggest alternative methods.

Active-context limitation is another disadvantage of software development tools. Active-context limitation relates to the suggestions presented by existing tools being limited to the set of libraries, modules and methods which are locally installed and linked either implicitly (e.g., using a makefile mechanism such as QT-PRO files) or explicitly (e.g., including modules in the source code). This is a narrow view and reutilization compared with the content of online accessible repositories of software components. This limitation causes at least two problems. First, the effectiveness of produced source code by a typical programmer results in suboptimal code compared to the standards set by expert committees on each application domain (e.g., a field of study that defines a set of common requirements, terminology, and functionality of any software program constructed to solve a problem in the area of computer programming). Second, the developer productivity is reduced by reinventing a poor performing "new wheel" rather than leveraging a well-established and/or industry-proven portion of code. Furthermore, in existing tools there is no automated way to present and empower developer awareness about other libraries or modules capable of doing the required processing, resulting in suboptimal product development. Because of this lack of organized visibility, the developer needs to either invest large amounts of time scouting for obsolete, obscure and/or uncharacterized libraries, or develop common code from scratch. Therefore, a technical burden and time efficiency challenge is associated with software development using current software development tools.

Systems, apparatus, articles of manufacture, and methods for a context and complexity-aware recommendation system for efficient software development disclosed herein alleviate the technical burden and time efficiency challenge associated with software development tools. Examples disclosed herein propose a recommendation system which suggests existing functions and libraries that can be exploited during the development or maintenance of routines or modules. Examples disclosed herein introduce an intelligent interactive system which is continuously recommending routines, modules and libraries to developers based on temporal source-code context and developer feedback. In contrast to ubiquitous spelling/grammar correction and completion systems, examples disclosed herein are not limited to lexical and syntactic analysis of the source code on a local active scope (e.g., text corrections, file path/name completion, class members listing, and control statement completion). Examples disclosed herein enable the construction of new and unique functionality in a manner that is faster and more accurate than traditional techniques. Examples disclosed herein include a recommending methodology using the ranking of plausible suggestions based on an Integral Computational Complexity Cost ($IC^3$). Example $IC^3$ descriptors comprehensibly reflect the implications associated with the eventual inclusion of each suggestion. Software component (s) have associated inclusion implications which categorically are expressed in terms of resource utilization, portability and deployment. Some of these inclusion implications are accompanied with an associated scale or metric. For some computational resources (e.g., memory foot print and computational time) there are canonical representations for time and space complexity (e.g., Big O notations O and $\Theta$), used to classify algorithms according to how their running time or space requirements grow as the input size grows. Meanwhile, for portability, there are hardware affinity, operative system and connectivity criteria which enforce polyadic selection criteria (e.g., selection criteria involving three or more elements). Example deployment metrics are characterized by licensing factors, software coexistence constraints (e.g., requiring containers or other virtualization) and bundle files distribution size.

Examples disclosed herein detail the exploitation of semantics to suggest alternative methods of software development by comparing plausible suggestions based on one or more $IC^3$ values. An improved software development process using a recommendation system can be made tractable by combining lexical and syntactical cues with code semantics based on artificial intelligence (AI). AI includes machine learning, which involves training models to recognize patterns over time, such that a system can automatically learn and improve from experience. To accomplish such learning improvements, machine learning relies on the use of neural networks (e.g., recurrent neural networks (RNNs), general adversarial networks (GANs), etc.), which are a set of algorithms designed to recognize patterns and perform clustering and classification. Such algorithms can be either supervised or unsupervised and linear or non-linear. In a supervised algorithm, all data is labeled (e.g., images of animals) and the algorithm learns to predict the output from an input data set, while in an unsupervised algorithm all data is unlabeled (e.g., no labels associated with an image) and the algorithm learns to model the underlying structure or distribution of data in order to "learn" more about a given data set. A large amount of input data where only some of the data is labeled is known as semi-supervised algorithm learning. The learning process permits a system to learn features and transform them into class labels for segmentation or classification. As such, artificial neural networks (e.g., mathematical models) are used as an approach to approximate functions $f: X-Y$ (e.g., non-linear functions) by learning from a large amount of input data that permits supervised, unsupervised, or semi-supervised learning. RNNs are used when context is important, such as when decisions from past iterations or samples can influence current decisions (e.g., analysis of a word in a sentence in the context of the other words within that sentence or previous sentences). General adversarial networks (GANs) are used to generate new data with the same statistics as a training set, which these networks accomplish by learning to mimic any distribution of data.

Examples disclosed herein incorporate sematic analysis by learning sequences of vectors from text embedding (e.g., learning vector representations) via neural networks, which allows for continuous code assistance via software component suggestions. In some examples, these suggestions are based on the analysis of network accessible source code projects and additional contextual cues provided by the developer to accelerate and improve the development process. In examples disclosed herein, capabilities of neural networks are exploited when learning sequence-to-sequence mappings of text inputs to Universal Code Snippet Locator (UCSL) outputs. Sequence-to-sequence mappings permit mapping of a fixed length input with a fixed length output where the length of the input and output may differ, such as training models to convert sequences in one domain (e.g., sentences in one language) to sequences in another domain (e.g., sentences in another language). In examples disclosed herein, the sequence-to-sequence mappings consist of mapping text inputs to UCSL outputs using vector embedding depicting partial-code semantics obtained by learnable representations. In examples disclosed herein, semi-supervised learning is used to blend sequence-to-sequence mapping capabilities over a representation (e.g., unsupervised learned embedding representation) of the code semantics. Blending of sequence-to-sequence mapping capabilities using semi-supervised learning permits the bi-directional linking of UCSL to possible inputs (e.g., inputs from user's code, argument inputs, etc.), as well as output variables and processing description text.

Methods, apparatus, articles of manufacture, and systems disclosed herein facilitate software development by exploitation of semantic analysis via machine learning technologies to provide suggestions of remotely located libraries and modules. This increases the productivity and quality of the developed software. Furthermore, examples disclosed herein support reduced system cost and increased performance by incorporation of external functionality based on computational complexity ranking. This provides a holistic measurement of the cost from memory management and execution time to third party licensing and deployment cost reduction.

Additionally, examples disclosed herein provide an AI-based automatic framework to accelerate vulnerability testing of the code. As such, using a written algorithm that performs machine learning-related tasks, the proposed recommendation system can further enhance the code's robustness by injecting adversarial inputs during algorithm training. Adversarial inputs are inputs that are intentionally designed to cause the model to make a mistake, thereby training it to become more resilient. Another consideration for software algorithms involves identifying different points where an unauthorized user can try to enter, or extract, data (attack surfaces). As a result, keeping attack surfaces as small as possible is a basic security measure to address security risks. In examples disclosed herein, the process of fuzzing (e.g., providing invalid, unexpected, or random data as inputs to a computer program) is accelerated using a generative adversarial network (GAN) and allows for the identification of vulnerabilities and attack surfaces of machine-written algorithms.

FIG. 1A is a block diagram illustrating an example environment 150 in which a context and complexity-aware recommendation system is implemented. In the illustrated example of FIG. 1A, the example environment 150 includes example users (e.g., example user 152, example user 154, example user 156, and example user 162), an example network 158, an example remote (e.g., cloud) data storage 160, an example server 164, and an example recommendation system 100. In the illustrated example, the recommendation system 100 is housed in the server 164. For example, the server 164 may include disk arrays or multiple workstations (e.g., desktop computers, workstation servers, laptops, etc.) in communication with one another or with select users (e.g., example user 162). In some examples, the server 164 is in communication with users (e.g., example user 152, example user 154, and example user 156) via one or more wired and/or wireless networks represented by network 158. Example network 158 may be implemented using any suitable wired and/or wireless network(s) including, for example, one or more data buses, one or more Local Area Networks (LANs), one or more wireless LANs, one or more cellular networks, the Internet, etc. The server 164 of the illustrated example in FIG. 1A records that a request was received from a user (e.g., user 152, user 154, and/or user 156) and allows the user(s) to access the recommendation system 100 for purposes of software development. The example remote data storage 160 can be used by the server 164 to retrieve data associated with user-provided inputs, inputs provided by another system (e.g., autonomous system), or any other inputs generated outside of the server 164 that are required for implementing the recommendation system 100 (e.g., functional description in natural language input, a list of input argument types, a list of return argument types, etc.).

Figure 1B:
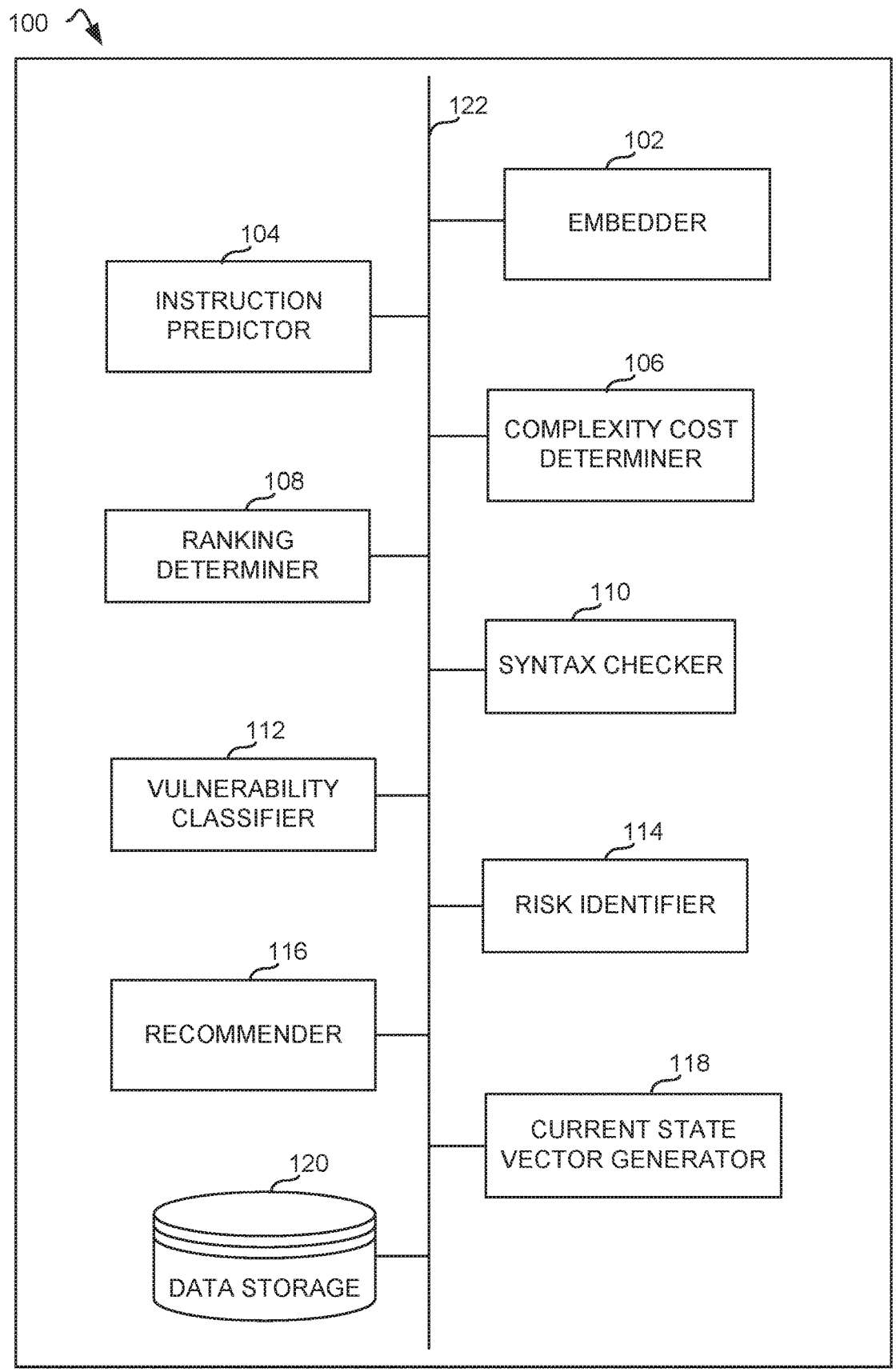
FIG. 1B is a block diagram of an example context and complexity-aware recommendation system, constructed in accordance with teachings of this disclosure for purposes of improved software development efficiency.

FIG. 1B is a block diagram of an example context and complexity-aware recommendation system 100, constructed in accordance with teachings of this disclosure for purposes of efficient software development. The example recommendation system 100 includes an example embedder 102, an example instruction predictor 104, an example complexity cost determiner 106, an example ranking determiner 108, an example syntax checker 110, and example vulnerability classifier 112, an example risk identifier 114, an example recommender 116, an example current state vector generator 118, and an example local data storage 120, all of which are connected using an example bus 122. The example embedder 102 performs embedding of any input provided (e.g., functional description in natural language, list of input argument types, list of return argument types) during software development using the recommendation system 100. In some examples, the embedder 102 retrieves the input information from the remote data storage 160 of FIG. 1A via network 158, and in some examples the embedder 102 retrieves the input from the local data storage 120. In some examples, the inputs are provided by a user 162 that has direct access to the server 164 within which the recommendation system 100 is housed. In some examples, the embedder instead retrieves these inputs from one or more users (e.g., users 152, 154, 156) via the network 158. In some examples, the embedder 102 is communicatively connected to an IDE or code editor that the user invokes for code entry (e.g., typing) and/or loading of previously saved code.

The example instruction predictor 104 generates a recommended software component based on the current state of the first function, the current state of the first function determined using the example current state vector generator 118. The current state vector generator 118 generates a representation of a current state of a function. Once the instruction predictor 104 has generated the recommended software components (e.g., code that is used to create a code base or application), these components are ranked based on one or more ranking metrics (e.g., a complexity cost determination, a risk/vulnerability determination, etc.). The complexity cost determiner 106 is therefore used to rank the recommended software component based on a weighted sum of associated partial cost values. The example complexity cost determiner 106 ranks the software component against other software component cost values.

The example risk identifier 114 detects a vulnerability metric based on an attack surface of a portion of the recommended software component. The risk identifier 114 includes an example vulnerability classifier 112 to perform risk scoring of the recommended software components. The example ranking determiner 108 outputs one or more recommended software components based on the ranking metrics. Once the recommendation system 100 has provided the output of recommended software components, the example recommender 116 invokes an example syntax checker 110 to confirm that the recommended functions or libraries are valid prior to presenting them to the user and allowing the user to select or reject recommended software components to be used in a new function state. The example local data storage 120 stores a corpus of libraries, functions, and modules.

While an example manner of implementing the recommendation system 100 for efficient software development is illustrated in FIGS. 1A-1B, one or more of the elements, processes and/or devices illustrated in FIGS. 1A-1B may be combined, divided, re-arranged, omitted, eliminated and/or implemented in any other way. Further, the example embedder 102, the example instruction predictor 104, the example complexity cost determiner 106, the example ranking determiner 108, the example syntax checker 110, the example vulnerability classifier 112, the example risk identifier 114, the example recommender 116, the example current state vector generator 118, the example local data storage 120, the example remote data storage 160, and/or, more generally, the example system 100 of FIGS. 1A-1B may be implemented by hardware, software, firmware and/or any combination of hardware, software and/or firmware. Thus, for example, any of the example embedder 102, the example instruction predictor 104, the example complexity cost determiner 106, the example ranking determiner 108, the example syntax checker 110, the example vulnerability classifier 112, the example risk identifier 114, the example recommender 116, the example current state vector generator 118, the example local data storage 120, the example remote data storage 160, and/or, more generally, the example system 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example embedder 102, the example instruction predictor 104, the example complexity cost determiner 106, the example ranking determiner 108, the example syntax checker 110, the example vulnerability classifier 112, the example risk identifier 114, the example recommender 116, the example current state vector generator 118, the example local data storage 120, and/or the example remote data storage 160, is/are hereby expressly defined to include a non-transitory computer readable storage device or storage disk such as a memory, a digital versatile disk (DVD), a compact disk (CD), a Blu-ray disk, etc. including the software and/or firmware. Further still, the example recommendation system 100 for efficient software development of FIGS. 1A and 1B may include one or more elements, processes and/or devices in addition to, or instead of, those illustrated in FIGS. 1A and 1B, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the system 100 of FIGS. 1A-1B are shown in FIGS. 2-6. The machine readable instructions may be an executable program or portion of an executable program for execution by a computer processor such as the processor 706 shown in the example processor platform 700 discussed below in connection with FIG. 7. The program(s) may be embodied in software stored on a non-transitory computer readable storage medium such as a CD-ROM, a floppy disk, a hard drive, a DVD, a Blu-ray disk, or a memory associated with the processor 706, but the entire program and/or parts thereof could alternatively be executed by a device other than the processor 706 and/or embodied in firmware or dedicated hardware. Further, although the example program(s) are described with reference to the flowcharts illustrated in FIGS. 2-6, many other methods of implementing the example system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 2-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B. and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 2:
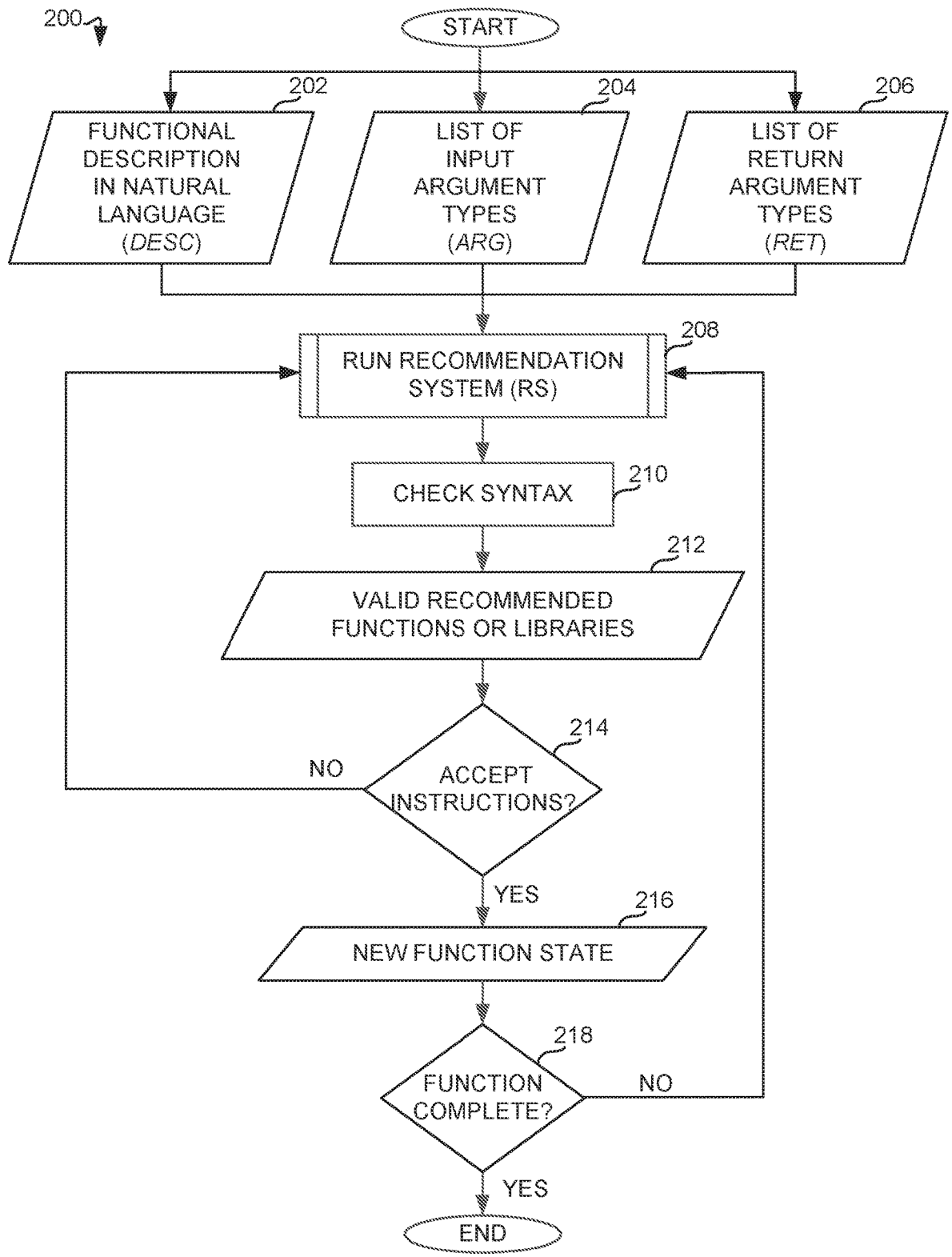
FIG. 2 is a flowchart representative of machine readable instructions which may be executed to implement elements of the example recommendation system of FIG. 1B, the flowchart representative of instructions implemented to generate a new function state using the recommendation system.

FIG. 2 is a flowchart representative of a program 200 (e.g., machine readable instructions) which may be executed to implement elements of the example recommendation system 100 of FIGS. 1A and/or 1B to generate a new function state. The example recommendation system 100 disclosed herein synthesizes new functions in terms of existing software bases (e.g., composition of SDKs and APIs) using 1) several a priori information cues about the new function, and 2) interactive updates using corrective feedback (e.g., feedback received from a developer). The example recommendation system 100 takes as input a function specification using three potential elements: an example first input having a functional description, desc (block 202), an example second input having a list of input arguments, arg (block 204), and an example third input having a list of output values, ret (block 206). In some examples, these inputs are provided by a user (e.g., user 152, 154, 156, and/or 162). In some examples, these inputs are retrieved from the local data storage 120 and/or the remote data storage 160 of FIGS. 1A and/or 1B. The example recommendation system 100 receives, retrieves and/or otherwise obtains a text in natural language describing the intended actions (e.g., with respect to processing of input arguments) for desired functions at a high-level (e.g., natural language input as distinguished from code). This first input is the functional description, desc (block 202). In some examples, inputs (e.g., retrieved from data storage 160 or input by a user) specify the expected input arguments, arg (block 204) of the new function. The arguments are specified by their data types and access patterns. Additionally, in some examples, a list of return data types, ret, is provided or retrieved (block 206). At block 208, the recommendation system 100 takes these function specifications (blocks 202, 204, and 206) as input to generate recommendations for instructions using existing functions and libraries (block 212) stored in the data storage 120, as described in further detail below in connection with FIG. 3. The example recommender 116 passes these instructions through a syntax validation phase (check syntax) (block 210) using the example syntax checker 110 to ensure the inference system is recommending only legal instructions by checking for syntax errors in each statement according to data set type. The example recommender 116 determines whether to accept a sequence of recommendations or selects instruction(s) to reject (block 214). In the event the example recommender 116 decides to reject (block 214), such as when syntax errors are detected by the example syntax checker 110, control returns to block 208, as described in further detail below. However, in the event the example recommender 116 decides to accept (block 214), such as when no syntax errors are detected by the example syntax checker 110, the system 100 updates the current state of the function with accepted instructions (block 216). The example current state vector generator 118 initializes the current state as empty before the first recommendation generation takes place, which occurs during the initial iteration of the program 200 of FIG. 2. The recommendation system 100 then takes the current state and function specifications as input to determine whether the function is complete (block 218) and, if the function is not yet complete, control returns to block 208 and iterates through the loop of utilizing the recommendation system 100 (block 208), checking syntax (block 210), outputting valid recommended functions or libraries (block 212), receiving input as to whether instructions are rejected or accepted (block 214), and updating the new function state (block 216) until the new function is complete (block 218).

Figure 3:
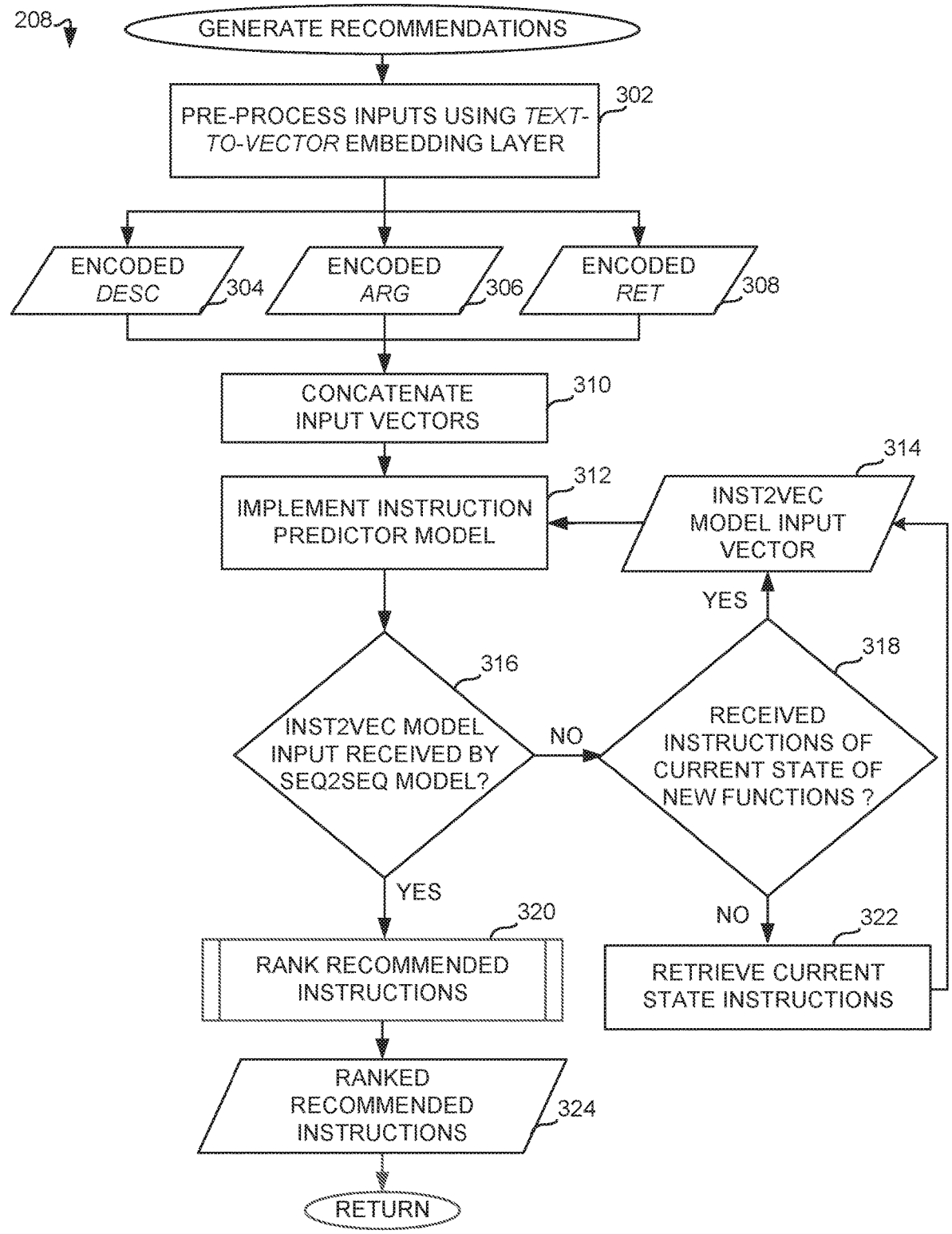
FIG. 3 is a flowchart representative of machine readable instructions which may be executed to implement elements of the example recommendation system of FIG. 1B, the flowchart representative of instructions used to generate recommendations.

FIG. 3 is a flowchart representative of additional detail associated with the program 208 to generate recommendations with the example recommendation system of FIGS. 1A and 1B. In the illustrated example of FIG. 3, the recommendation system 100 preprocesses the inputs provided at blocks 202, 204, and 206 of FIG. 2 using one or more text-to-vector embedding layers provided by the embedder 102 of FIG. 1B (block 302). In some examples, the embedder 102 facilitates one-hot encoding of the inputs desc, arg, and ret to construct vectors representing these inputs. In some examples, the one-hot embedding can be more suitable than one or more alternate types of embedding (e.g., word2vec). For example, due to its sparsity and unsupervised nature, the one-hot embedding performed by the example embedder 102 is capable of interactively adapting to the reachable corpus of libraries, modules and functions (e.g., stored in the example local data storage 120 and/or the example remote data storage 160). The example embedder 102 outputs corresponding encoded vectors desc_enc (block 304), arg_enc (block 306), and ret_enc (block 308) and concatenates these outputs to construct an input for the instruction predictor 104 (block 310). In some examples, the instruction predictor 104 is implemented as a sequence-to-sequence (seq2seq) model using teacher forcing, as described in further detail below in connection with block 312. As used herein, teacher forcing is the technique of applying real target outputs for each sub-sequential input, instead of using the decoder's guess as the next input. In some examples, applying teacher forcing permits a relatively faster convergence for the recommendation system 100 as compared to traditional techniques.

To implement the instruction predictor model (block 312), the example instruction predictor 104 determines whether the seq2seq model has received an inst2vec input vector (block 314) (generated using an inst2vec model) representing the current state of a new function (block 316). The example current state vector generator trains the inst2vec model offline (e.g., using a static data set) using a network reachable corpus of software programs (e.g., a collection of Personal Package Archives repositories). In some examples, this program corpus can also be used to train and link the seq2seq models using the example instruction predictor 104. If the instruction predictor 104 determines that the inst2vec model input vector (block 314) has not been received (block 316), the instruction predictor 104 confirms whether the current state vector generator 118 has received instructions of the current state of new functions (block 318). If the instruction predictor 104 determines that the inst2vec model input vector has been received by the seq2seq model (block 316), the recommendation system 100 proceeds to rank the recommended instructions (block 320). If the instructions have not been received (block 318), the current state vector generator 118 retrieves the current state instructions (block 322) and proceeds to output the instructions (block 314) using the inst2vec model. The inst2vec model input vector instructions (block 314) are provided to the instruction predictor model (block 312) to proceed with ranking of recommended instructions (block 320). The example ranking determiner 108 ranks the recommended instructions (block 320) and outputs the ranked recommended instructions (block 324). The recommended instructions are then accepted or rejected (e.g., by a system or user) (block 214 of FIG. 2) once the syntax checker 110 has performed a syntax check at block 210.

Figure 4:
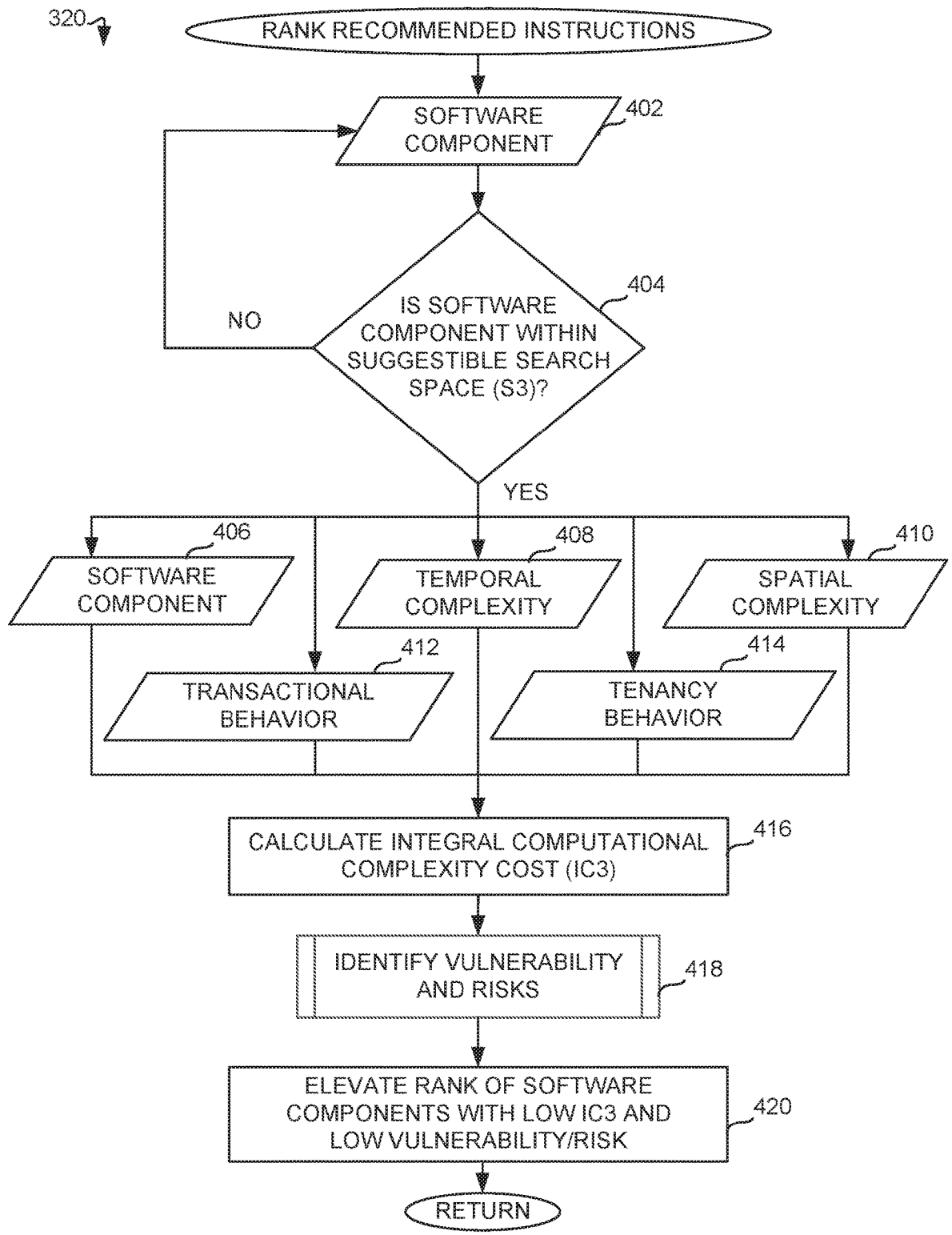
FIG. 4 is a flowchart representative of machine readable instructions which may be executed to implement elements of the example recommendation system of FIG. 1B, the flowchart representative of instructions used to rank instructions recommended by the example recommendation system of FIG. 3.

FIG. 4 illustrates additional detail associated with ranking recommended instructions (block 320) of FIG. 3. To make plausible, effective and efficient recommendations, examples disclosed herein proceed to select and rank software components in terms of directives for feasibility and/or compounded inclusion cost. This cost is determined according to any number of different technical and/or economic factors. However, prior to proceeding with the ranking, the example system 100 first identifies if a software component input (block 402) is within a suggestible search space ($S^3$) (block 404). For example, if a software component is found to be within the $S^3$, it is possible to propose its inclusion into the project. In some examples, binary switches can be used to determine whether a software component is within the suggestible search space. For example, it is possible to manage many context aspects (e.g., project setup, suggestions settings) by static directive, namely settings which include binary switches and scalar parameters. These settings determine if software libraries, modules or other forms of components are considered part of the $S^3$, such as when the user activates flags which determine if these modules are available or not during the implementation. For example, a flag can be activated to search in FPGA/GPU-capable libraries, this action resulting in a request for more information about the memory range, architecture and number of cores in the GPU available in the target machine, as well as the other information (e.g., FPGA with respective logical units, floating point hardware extensions, memory banks, etc.). Additionally, scalar parameters can also be used as context static values to determine the inclusion feasibility for certain software components based on a threshold value (e.g., a threshold code size value, a threshold deployment size value, a threshold execution speed value, etc.). For example, the inclusion of a library will impact the deployment size of an installation package. This is relevant for mobile targets and other scenarios where a threshold value constrains the inclusion of libraries and assets due to, for instance, limited storage capabilities.

In order to propose a software component's inclusion into the project, the ranking determiner 108 determines whether the software component is within the $S^3$ (block 404). The decision about which component (e.g., with similar or identical) functionality is included is determined based on one or more ranking metrics. These metrics relate the resource's consumption impact during execution depending on, for instance, the input size and data content. The resources encompass the time of execution, memory footprint, and storage flow in comparison to the memory/cache stationarity and hardware tenancy. The ranking metrics include the integral computational complexity cost ($IC^3$) of a certain software component input determined to be within $S^3$ (block 406) using as inputs information about, for example, temporal complexity input (block 408), spatial complexity input (block 410), transactional behavior input (block 412), and/or tenancy behavior input (block 414).

The example temporal complexity input (block 408) is related to the amount of operations (Z) required to compute the algorithm implemented by a selected software component (block 402) and can be formally expressed as a function of its input size (n), using the formula $n \in Z^+$. When dealing with a polynomial time algorithm, it is commonly represented by the maximal order of its complexity expression. This is formally known as the Big-O notation. There are other notations (e.g., $\theta$ and $\Omega$ symbols) for the maximal and minimal number of operations considering the content distribution of the input data. Based on this formalism it is possible to assign a formal temporal complexity to each software component as part of its documentation embedded in the code by means of in-place documentation methods (e.g., such as Doxygen). In this way, the indexing and retrieval neural mechanisms are capable of managing and presenting this information (e.g., to a developer). As such, it is possible to observe different algorithms for solving the same problem considering identical inputs and outputs. Selecting a suitable algorithm can depend on factors such as memory implications, as well as prior knowledge about the data distribution and stability requirements.

The example spatial complexity input (block 410) relates to the amount of memory required to compute an algorithm and can be expressed as a function of its input size and data content. By employing the same formalism used in temporal complexity, it is feasible to canonically characterize the memory requirements of a software component (block 402). This enables informed decision making when including one particular software component versus another. For example, selecting a Merge sort (e.g., an efficient, general-purpose, comparison-based sorting algorithm) may be ideal due to its execution stability and low temporal complexity. However, due to its splitting-merging pattern, it requires double of the original memory footprint. This may be a critical issue for a particular target platform p, thus the software component based on this algorithm would not be included. If, for example, this memory impact is suitable for the target platform p, it is possible to select the best design based on known limitations by partitioning the time and space memory under a stable runtime performance. The disclosed recommendation system 100 and corresponding ranking of recommended instructions takes such system complexity into account by considering various algorithm options. For example, other algorithms (e.g., such as Cubesort and Timsort) may be more appropriate to implement in certain scenarios compared to the Merge sort algorithm described above. However, because of their sequential access patterns (e.g., group of elements accessed in a pre-determined, ordered sequence), these algorithms are not highly parallelizable (e.g., able to be executed a piece at a time on many different processing devices, processor cores, etc.). Such additional information can be provided during software development (e.g., via an iconographic language in contextual menus) to ensure superior suggestion support not included with other software development systems.

Depending on each algorithm's memory access pattern, the rate of memory read/write operation compared to computational operations describes the transactional nature (characteristics) of the software component, which serves as the transactional behavior input (block 412). In some examples, this is measured as a ratio of bytes per second versus arithmetic and logical operations in both a canonical ($i \in R^+$) and a device-specific manner ($\kappa_p \in R^+$). Example canonical information indicates that specialized instructions, such as multiple operations, fuse operations, or other multimedia/vector extensions, are not considered. Device specific (formally denoted by the sub-index p) parameters provide this ratio depending on known extensions and vectorization levels of specific computational devices.

The example tenancy behavior input (block 414) reflects the utilization of diverse resources along the execution of an algorithm. For example, a kernel executing in a graphics processing unit (GPU) can require the central processing unit (CPU) to execute portions of instructions at the beginning and/or end of this process to orchestrate the data transfers, set asynchronous events to pipeline other kernels, etc. Some recent improvements in parallel computation devices (e.g., such as file programmable gate arrays (FPGAs) and GPUs) reduce the intervention of the CPU to a negligible level. This is done via direct memory access (DMA) channels in the host computer and pipes- and first in, first out (FIFOs)-like mechanism in the FPGAs. This example tenancy behavior input (block 414) is represented by a sum-normalized signature vector which describes the used resources and relative time utilization. For example, if a host is equipped with two GPUs and one FPGA in the context of an eight-core processor, then a software component occupying one GPU fully and a short CPU time would express its tenancy behavior signature as $\phi$=[CPU_0:0.1, GPU_A: 0.9, GPU_B: 0, FPGA_0:0].

Once the above inputs have been provided (e.g., at blocks 406, 408, 410, 412, 414), the example computations cost determiner 106 calculates the integral computational complexity cost ($IC^3$) (block 416). As used herein, the term $IC^3$ refers to an overall ranking of a software component obtained as a weighted sum of its partial costs. For example, during the project setup, predefined weighting templates can be selected by application profile or weighting values provided for each aspect and associated order or class. In some examples, the complexity cost determiner 106 sets an example temporal complexity weighting vector ($\psi_t$) to $$\psi_t := [O_t(0) \to 0, O_t(n) \to 1, O_t(n^2) \to 2, O_t(n^3) \to 8, O_t(n^4) \to 32, \infty]$$  Equation 1

Example Equation 1 indicates that a software component whose temporal complexity is higher than quartic order (e.g., $O_t(n^4)$) is not to be considered. In the illustrated example of Equation 1, each dimension (e.g., $O_t(n)$) is a scalar value (e.g., 1) and a positive real value. Likewise, the spatial complexity weighting vector's allows the system to weight the memory consumption of each software component. Additionally, for a software component $\varphi_i$, the example ranking determiner 108 determines a canonical (no platform dependency p) ranking $\lambda \in R^+$ in a manner consistent with example Equation 2.

$$\lambda(\varphi_i, \psi_t, \psi_s) = \Sigma_{j=0}^{m} [\psi_t \odot O_t(\varphi_i)] + [\odot O_s(\varphi_i)]$$  Equation 2

In the illustrated example of Equation 2, the operator $\odot$ represents a scalar multiplication iff the complexity $O_t$ corresponds to the sliding order j. In Equation 2, m represents a maximal order of a polynomial time algorithm complexity expression, as is also used to determine temporal complexity described above. The example complexity cost determiner 106 determines an example integral computational complexity cost $IC^3$ (block 416) (denoted by $\mu$) in a manner consistent with example Equation 3.

$$\mu(\varphi_i, \rho) = [\lambda(\varphi_i, \psi_t, \psi_s), (\iota, \kappa_p) \phi]$$  Equation 3

In the illustrated example of Equation 3, a ranking $\lambda(\varphi_i, \psi_t, \psi_s)$ allows the system 100) to provide a sorted display (e.g., a list) of the software components under consideration. Meanwhile, the transactional and tenancy behavior descriptors facilitate well informed designs considering other side effects relevant to the whole application at each local level in the source code. Once the recommendation system 100 has computed the $IC^3$ (block 416) using the complexity cost determiner 106, it proceeds to identify vulnerabilities and risks associated with the software component (block 418). The examiner ranking determiner 108 determines ranking of the software components (block 420) based on the evaluated ranking metrics (e.g., $IC^3$ and the level of vulnerability/risk).

Figure 5:
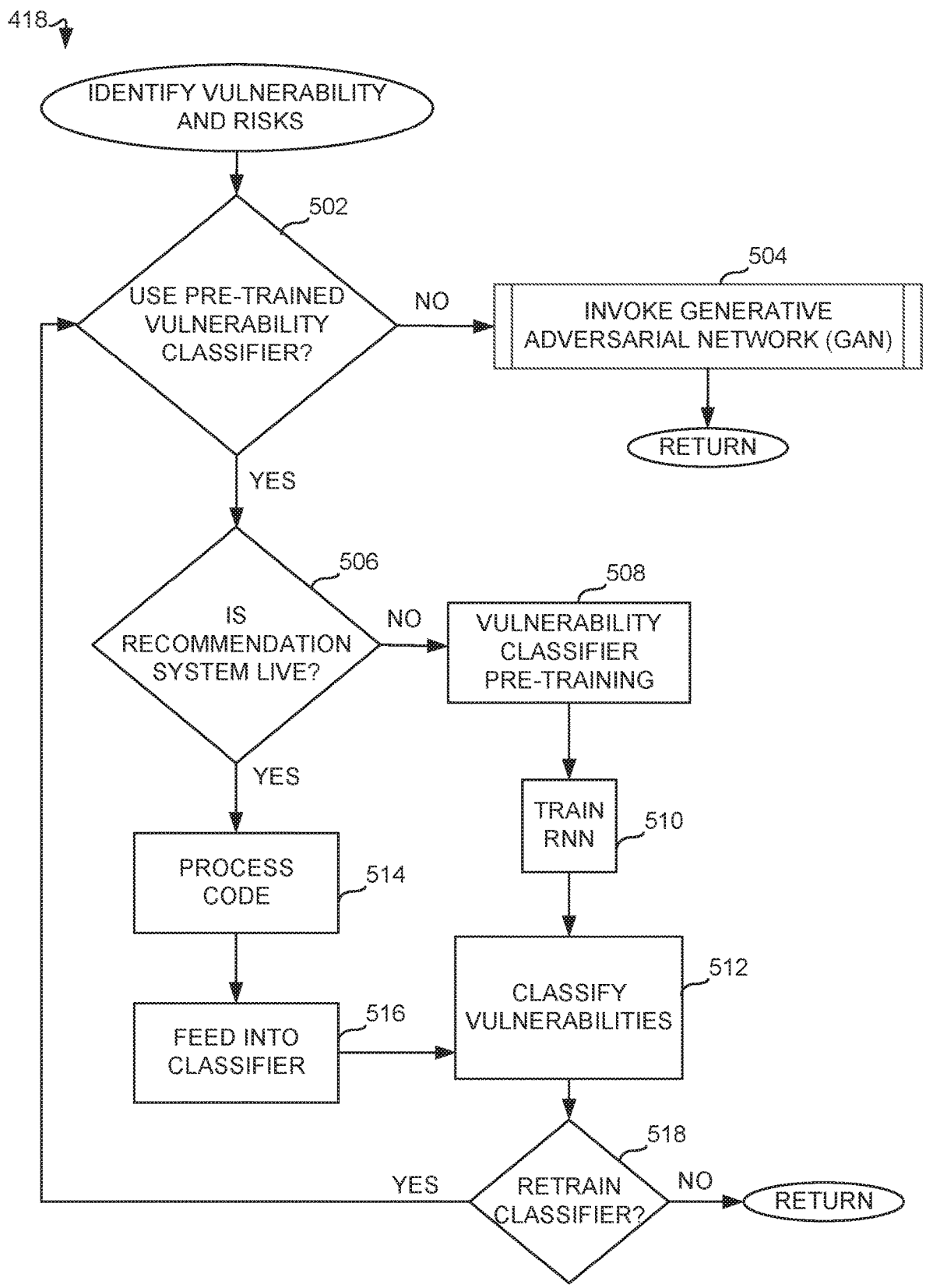
FIG. 5 is a flowchart representative of machine readable instructions which may be executed to implement elements of the example recommendation system of FIG. 1B, the flowchart representative of instructions used to identify vulnerability and risks during the ranking of instructions performed in FIG. 4.

FIG. 5 illustrates additional detail associated with identifying vulnerability and risks (block 418) of FIG. 4. The example vulnerability classifier 112 and the example risk identifier 114 are used to identify vulnerabilities and risks, respectively. Code vulnerability and bugs can expose the software to risks and attacks. The example recommendation system 100 provides vulnerability and risk assessment of the algorithm via examining the attack surfaces of the programs (e.g., machine-written). As previously described, identifying different points where an unauthorized access can be gained to enter, or extract, data is performed by examining the attack surfaces of the programs-keeping attack surfaces as small as possible being a basic security measure to address security risks. To achieve this, the example recommendation system 100 provides: 1) a pre-trained vulnerability classifier that determines whether the written code belongs to any common vulnerability exposure (CVE) and 2) a generative modeling procedure to generate inputs and fuzz (e.g., provide invalid, unexpected, or random data as inputs) the algorithms to identify vulnerabilities and bugs.

To perform vulnerability classification, the example vulnerability classifier 112 is pre-trained to detect code vulnerability. For example, before making the recommendation system go live (e.g., ready for deployment in a software development environment, including the example environment 150 of FIG. 1A) the vulnerability classifier 112 pre-trains itself (block 508). Pre-training (block 508) can be performed using, for example, a CVE database and Juliet test suites stored in the local data storage 120 and/or remote data storage 160. For example, using the Juliet test suites, a standard natural language processing (NLP) technique can be implemented on the dissembled code such that each processed sample is represented as a one-hot vector followed by embedding. Once the vulnerability classifier 112 pre-trains itself (block 508), the recommendation system 100 trains a recurrent neural network (RNN) (block 510) and facilitates vulnerability classification (block 512). If, however, the example recommendation system 100 is determined to be live (block 506), then code generated by the recommendation system 100 is simultaneously processed (at block 514) using the same NLP technique (e.g., as used in training the vulnerability classifier 112), and fed into the vulnerability classifier 112 (at block 516) to evaluate whether there is a code vulnerability (block 512). Additionally, as the recommendation system 100 updates vulnerability categories using the CVE database, the vulnerability classifier 112 can adaptively re-train itself (block 518) to reflect the latest vulnerability categories. Depending on the status of the vulnerability and risk identification, the example recommendation system 100 determines whether to proceed to use the pre-trained vulnerability classifier (block 502) to engage vulnerability classification and/or the recommendation system 100 can proceed with algorithm attack surface examination and risk assessment by invoking the generative adversarial network (GAN) step (block 504) of FIG. 6.

Figure 6:
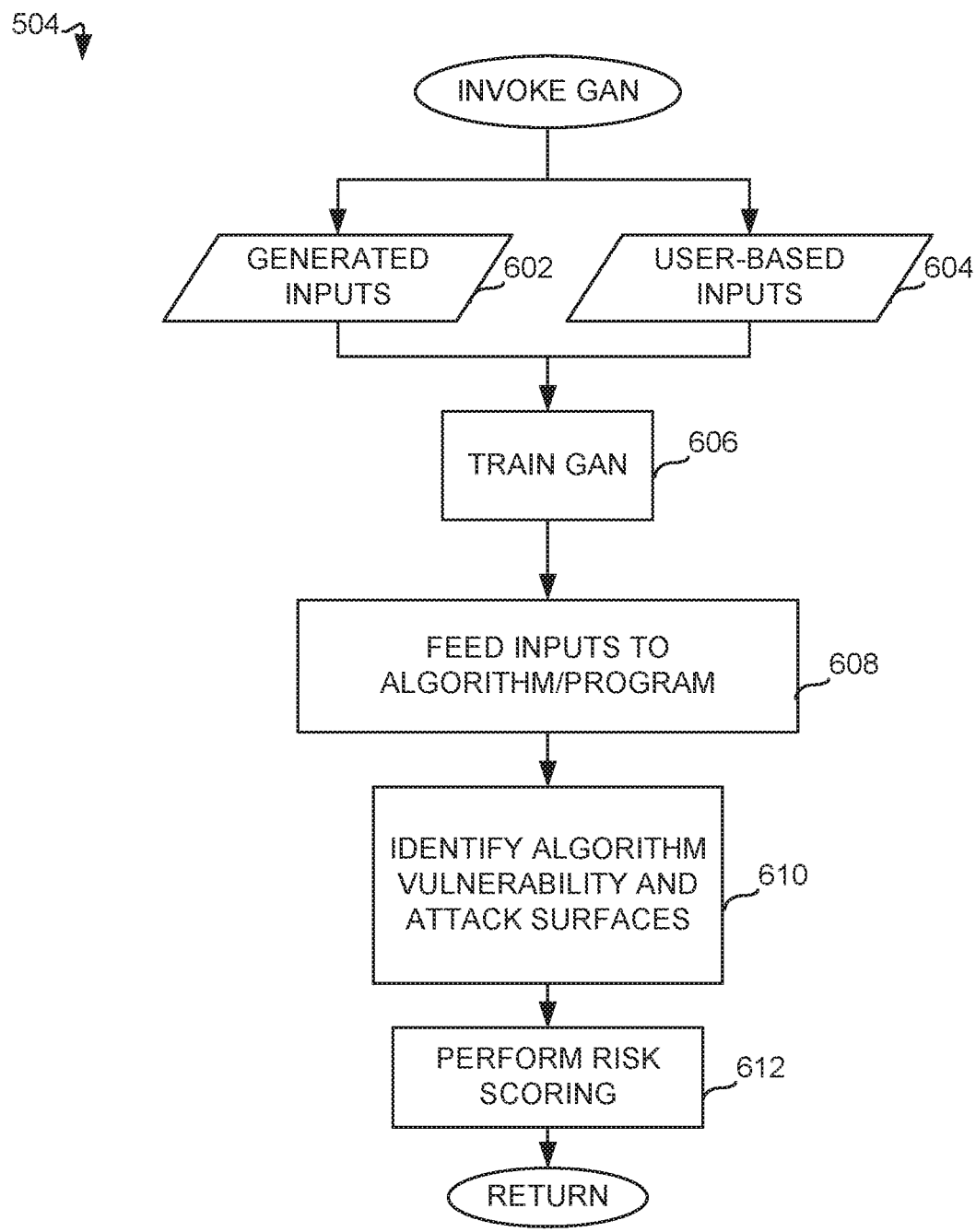
FIG. 6 is a flowchart representative of machine readable instructions which may be executed to implement elements of the example recommendation system of FIG. 1B, the flowchart representative of instructions used to invoke a generative adversarial network as part of the process of identifying vulnerabilities and risks in FIG. 5.

FIG. 6 illustrates additional detail associated with invoking a generative adversarial network (GAN) (block 504) of FIG. 5. In GAN training, the first model of a GAN is the generator model, which aims to generate new data similar to the expected data, and the second model is the discriminator model, which recognizes if input data is real (e.g., belongs or does not below to an original dataset). Once the generator succeeds in creating data that the discriminator cannot distinguish from an original dataset, the GAN is considered to be trained. Part of the GAN training process involves optimization of opposite loss functions: The discriminator attempts to maximize the probability of having its outputs recognized as real, while the generator attempts to minimize this probability. For example, the risk identifier 114 is used to carefully synthesize inputs to exploit the blind spots of the written algorithm. A GAN can be used to synthesize random inputs to write the algorithm and evaluate the attack surface of the algorithms. For example, to train the GAN, real inputs or inputs the programmers (e.g., human programmers or machine programmers) are aware of are used as inputs (block 604), and generated generalized inputs that were not previously considered are also used as inputs (block 602), to test the security of the program or algorithm. The example risk identifier 114 performs a first iteration of training the GAN (block 606), such that the inputs to this submodule are real inputs and random noise. The outputs, after terminating the training at the loss function of the discriminator, are generated inputs (block 608) to the written algorithm or program. The example risk identifier 114 feeds these generated inputs into the algorithm/program to identify attack surfaces and vulnerability of the code (block 610). The example risk identifier 114 also performs an additional assessment of a software component, which involves risk scoring (block 612). Risk scoring can be defined in a manner consistent with example Equation 4.

$$\text{Risk}(A) = \frac{n}{\epsilon N} \qquad \text{Equation 4}$$

In Equation 4, n is the number of inputs that can exploit the code, $\epsilon$ is the number of epochs to finish training the GAN. In particular, the longer it takes to train the GAN, the more costly (e.g., resource intensive) it is on the example risk identifier 114 to exploit the algorithmic blind spot, hence reversely multiplied. Also, in the illustrated example of Equation 4, N is the total number of generated inputs (e.g., generated inputs 602). Therefore, the use of this recommendation system 100 submodule provides an AI-based automatic framework to accelerate the vulnerability test of the code. As such, if the written algorithm performs machine learning related tasks, the recommendation system 100 can further enhance the code's robustness by injecting the adversarial inputs to training the algorithm.

Figure 7:
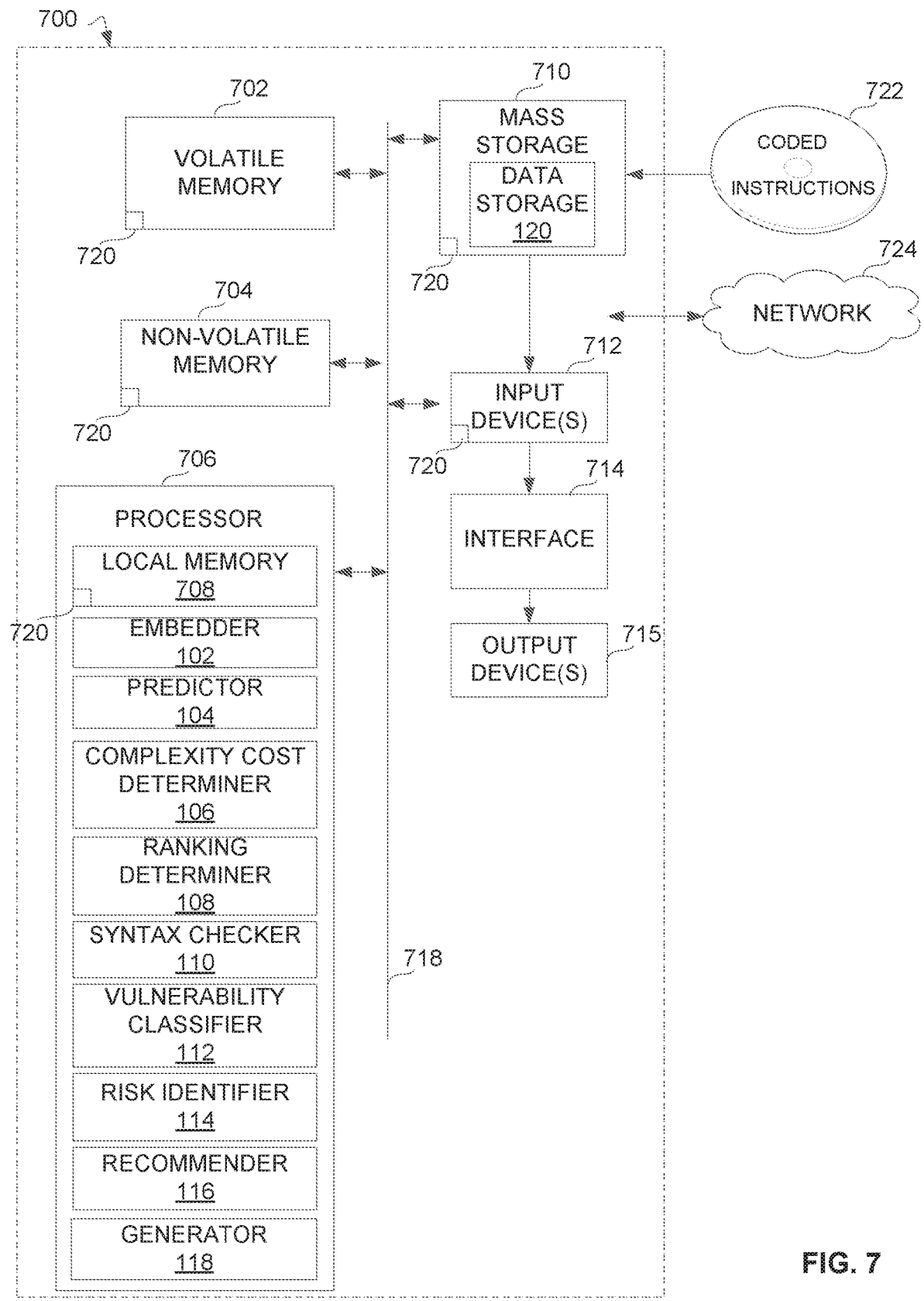
FIG. 7 is a block diagram of an example processing platform structured to execute the instructions of FIG. 2-6 to implement the example recommendation system of FIG. 1B.

FIG. 7 is a block diagram of an example processing platform 700 structured to execute the instructions of FIG. 2-6 to implement the example recommendation system of FIG. 1B. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 706. The processor 706 of the illustrated example is hardware. For example, the processor 706 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 706 implements the embedder 102, the predictor 104, the complexity cost determiner 106, the ranking determiner 108, the syntax checker 110, the vulnerability classifier 112, the risk identifier 114, the recommender 116, and the generator 118.

The processor of the illustrated example includes a local memory 708 (e.g., a cache). The processor 706 of the illustrated example is in communication with a main memory including a volatile memory 702 and a non-volatile memory 704 via a bus 718. The volatile memory 702 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 704 may be implemented by flash memory and/or any other desired type of memory device. Access to the main memory 702, 704 is controlled by a memory controller.

The processor platform 700 of the illustrated example also includes an interface circuit 714. The interface circuit 714 may be implemented by any type of interface standard, such as an Ethernet interface, a universal serial bus (USB), a Bluetooth® interface, a near field communication (NFC) interface, and/or a PCI express interface.

In the illustrated example, one or more input devices 712 are connected to the interface circuit 714. The input device(s) 712 permit(s) a user to enter data and/or commands into the processor 706. The input device(s) 712 can be implemented by, for example, an audio sensor, a microphone, a camera (still or video), a keyboard, a button, a mouse, a touchscreen, a track-pad, a trackball, an isopoint device, and/or a voice recognition system.

One or more output devices 716 are also connected to the interface circuit 714 of the illustrated example. The output devices 716 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 714 of the illustrated example, thus, typically includes a graphics driver card, a graphics driver chip, and/or a graphics driver processor.

The interface circuit 714 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 724. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 710 for storing software and/or data, including the example local data storage 120. Examples of such mass storage devices 710 include floppy disk drives, hard drive disks, compact disk drives, Blu-ray disk drives, redundant array of independent disks (RAID) systems, and digital versatile disk (DVD) drives.

The machine executable instructions 722 of FIG. 7 may be stored in the interface circuit 714, the mass storage device 710, the processor's local memory 708, the volatile memory 702, the non-volatile memory 704, and/or on a removable non-transitory computer readable storage medium such as a CD or DVD.

From the foregoing, it will be appreciated that example systems, methods, apparatus, and articles of manufacture have been disclosed for a context and complexity-aware recommendation system that can be implemented for purposes of efficient software development. The examples disclosed herein introduce an interactive system based on machine learning which is continuously recommending routines, modules and libraries to developers based on temporal source-code context and developer's feedback. The methods and systems disclosed herein facilitate software development by exploitation of semantic analysis via machine learning technologies to provide intelligent suggestions of remotely located libraries and modules. This increases the productivity and quality of the developed software. Furthermore, examples disclosed herein support reduced system cost and increased performance by incorporation of external functionality based on computational complexity ranking. This provides a holistic measurement of the cost from memory management and execution time to third party licensing and deployment cost reduction.

Disclosed herein are example systems, apparatus, articles of manufacture, and methods for a context and complexity-aware recommendation system for purposes of efficient software development are disclosed. Example 1 includes an apparatus for software development, including a current state generator to generate a representation of a current state of a new function, an instruction predictor to generate a first recommended software component based on the current state of the new function, a complexity cost determiner to rank the first recommended software component based on a weighted sum of associated partial cost values, the software component to be ranked against second recommended software components based on a comparison of partial cost values corresponding to respective ones of the second recommended software components, a risk identifier to detect vulnerabilities based on an attack surface of a portion of the first recommended software component, and a ranking determiner to generate a third recommended software component, the third recommended software component corresponding to respective ranking metrics.

Example 2 includes the apparatus of Example 1, wherein the respective ranking metrics include ranking based on at least one of complexity cost or risk, wherein the ranking based on the risk includes detection of vulnerability.

Example 3 includes the apparatus of Example 1, further including an encoder to encode at least one of a new function specification, a list of input arguments, or a list of return argument types.

Example 4 includes the apparatus of Example 3, further including a vulnerability classifier to perform risk scoring of the third recommended software component.

Example 5 includes the apparatus of Example 4, further including a recurrent neural network to classify the vulnerabilities.

Example 6 includes the apparatus of Example 4, wherein the vulnerability classifier is pre-trained using at least one of a common vulnerability exposure (CVE) database or a Juliet test suite.

Example 7 includes the apparatus of Example 4, further including a neural network, the neural network implemented as a generative adversarial network (GAN).

Example 8 includes the apparatus of Example 7, wherein the risk scoring includes at least one of a number of inputs that can exploit a software code, a number of epochs to finish training the neural network, or a total number of generated inputs.

Example 9 includes the apparatus of Example 3, wherein the instruction predictor is to receive as input at least one of the encoded new function specification or the current state representation, the instruction predictor including a sequence-to-sequence (seq2seq) model, the seq2seq model further including teacher forcing.

Example 10 includes the apparatus of Example 9, wherein the seq2seq model includes semi-supervised learning.

Example 11 includes the apparatus of Example 9, wherein the instruction predictor includes an instruction-to-vector (inst2vec) model, the inst2vec model to provide an input vector representative of the current state of the function.

Example 12 includes the apparatus of Example 11, wherein at least one of the inst2vec model or the seq2seq model is trained offline using a network reachable software program corpus.

Example 13 includes the apparatus of Example 3, wherein the new function specification is at least one of a functional description, a list of input arguments, or a list of output values.

Example 14 includes the apparatus of Example 13, wherein the encoder is to perform one-hot encoding of the new function specification, the one-hot encoding including unsupervised learning.

Example 15 includes the apparatus of Example 3, wherein the instruction predictor is to iterate through a process of receiving the new function specification input and the current state representation input until the new function is complete.

Example 16 includes the apparatus of Example 1, wherein the recommended software component includes at least one of a routine, a module, or a library.

Example 17 includes the apparatus of Example 1, wherein the current state generator is to initialize the current state representation as empty before a first recommended software component is generated.

Example 18 includes the apparatus of Example 1, wherein the complexity cost determiner is to rank the software component if the software component is within a suggestible search space, the suggestible search space determined using a binary switch.

Example 19 includes the apparatus of Example 1, wherein the complexity cost function for a software component is calculated using at least one of a temporal complexity, a spatial complexity, a transactional behavior, or a tenancy behavior.

Example 20 includes a computer-implemented method for software development, the method including generating, by executing an instruction with at least one processor, a representation of a current state of a new function, generating, by executing an instruction with the at least one processor, a first recommended software component based on the current state of the new function, ranking, by executing an instruction with the at least one processor, the first recommended software component based on a weighted sum of associated partial cost values, the software component ranked against second recommended software components based on a comparison of partial cost values corresponding to respective ones of the second recommended software components, detecting, by executing an instruction with the at least one processor, vulnerabilities based on an attack surface of a portion of the first recommended software component, and generating, by executing an instruction with the at least one processor, a third recommended software component, the third recommended software component corresponding to respective ranking metrics.

Example 21 includes the method of Example 20, wherein the respective ranking metrics include ranking based on at least one of complexity cost or risk, wherein the ranking based on the risk includes detection of vulnerability.

Example 22 includes the method of Example 20, further including encoding at least one of a new function specification, a list of input arguments, or a list of return argument types.

Example 23 includes the method of Example 22, further including performing risk scoring of the third recommended software component.

Example 24 includes the method of Example 23, further including classifying the vulnerabilities using a recurrent neural network.

Example 25 includes the method of Example 24, wherein the risk scoring includes at least one of a number of inputs that can exploit a software code, a number of epochs to finish training the neural network, or a total number of generated inputs.

Example 26 includes the method of Example 23, further including pre-training a vulnerability classifier using at least one of a common vulnerability exposure (CVE) database or a Juliet test suite.

Example 27 includes the method of Example 22, wherein generating a first recommended software component includes receiving as input at least one of the encoded new function specification or the current state representation, and applying teacher forcing with a sequence-to-sequence (seq2seq) model.

Example 28 includes the method of Example 27, further including causing semi-supervised learning via the seq2seq model.

Example 29 includes the method of Example 27, further including providing an input vector representative of the current state of the function using an instruction-to-vector (inst2vec) model.

Example 30 includes the method of Example 29, further including performing ofine training of at least one of the inst2vec model or the seq2seq model using a network reachable software program corpus.

Example 31 includes the method of Example 22, further including performing one-hot encoding of the new function specification, the one-hot encoding including unsupervised learning.

Example 32 includes the method of Example 20, further including iterating through a process of receiving a new function specification input and the current state representation input until the new function is complete.

Example 33 includes the method of Example 20, further including initializing the current state representation as empty before a first recommended software component is generated.

Example 34 includes the method of Example 20, further including ranking the software component if the software component is within a suggestible search space, the suggestible search space determined using a binary switch.

Example 35 includes the method of Example 20, further including calculating a complexity cost function for a software component using at least one of a temporal complexity, a spatial complexity, a transactional behavior, or a tenancy behavior.

Example 36 includes a non-transitory computer readable storage medium comprising computer readable instructions that, when executed, cause one or more processors to, at least generate a representation of a current state of a new function, generate a first recommended software component based on the current state of the new function, rank the first recommended software component based on a weighted sum of associated partial cost values, the software component to be ranked against second recommended software components based on a comparison of partial cost values corresponding to respective ones of the second recommended software components, detect vulnerabilities based on an attack surface of a portion of the first recommended software component, and generate a third recommended software component, the third recommended software component corresponding to respective ranking metrics.

Example 37 includes the storage medium of Example 36, wherein the instructions, when executed, further cause the one or more processors to rank based on at least one of complexity cost or risk, wherein the ranking based on the risk includes detection of vulnerability.

Example 38 includes the storage medium of Example 36, wherein the instructions, when executed, further cause the one or more processors to encode at least one of a new function specification, a list of input arguments, or a list of return argument types.

Example 39 includes the storage medium of Example 38, wherein the instructions, when executed, further cause the one or more processors to perform one-hot encoding of the new function specification, the one-hot encoding including unsupervised learning.

Example 40 includes the storage medium of Example 36, wherein the instructions, when executed, further cause the one or more processors to classify vulnerabilities using a recurrent neural network.

Example 41 includes the storage medium of Example 40, wherein the instructions, when executed, further cause the one or more processors to include at least one of a number of inputs that can exploit the software code, a number of epochs to finish training the neural network, or a total number of generated inputs.

Example 42 includes the storage medium of Example 41, wherein the instructions, when executed, further cause the one or more processors to pre-train a vulnerability classifier using at least one of a common vulnerability exposure (CVE) database or a Juliet test suite.

Example 43 includes the storage medium of Example 36, wherein the instructions, when executed, further cause the one or more processors to perform risk scoring of the third recommended software component.

Example 44 includes the storage medium of Example 36, wherein the instructions, when executed, further cause the one or more processors to receive as input at least one of an encoded new function specification or the current state representation, and apply teacher forcing with a sequence-to-sequence (seq2seq) model.

Example 45 includes the storage medium of Example 44, wherein the instructions, when executed, further cause the one or more processors to provide an input vector representative of the current state of the function using an instruction-to-vector (inst2vec) model.

Example 46 includes the storage medium of Example 45, wherein the instructions, when executed, further cause the one or more processors to perform offline training of at least one of the inst2vec model or the seq2seq model using a network reachable software program corpus.

Example 47 includes the storage medium of Example 36, wherein the instructions, when executed, further cause the one or more processor to iterate through a process of receiving a new function specification input and the current state representation input until the new function is complete.

Example 48 includes the storage medium of Example 36, wherein the instructions, when executed, further cause the one or more processors to initialize the current state representation as empty before a first recommended software component is generated.

Example 49 includes the storage medium of Example 36, wherein the instructions, when executed, further cause the one or more processors to rank the software component if the software component is within a suggestible search space, the suggestible search space determined using a binary switch.

Example 50 includes the storage medium of Example 36, wherein the instructions, when executed, further cause the one or more processors to calculate a complexity cost function for a software component using at least one of a temporal complexity, a spatial complexity, a transactional behavior, or a tenancy behavior.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus for software development, comprising:
   at least one memory;
   instructions in the apparatus; and
   processor circuitry to execute the instructions to:
   generate a representation of a current state of a function based on an instruction-to-vector model, the instruction-to-vector model trained using a network reachable corpus of software programs;
   generate a first recommended software component based on the current state of new function using a sequence-to-sequence model, the network reachable corpus used to train the sequence-to-sequence model;
   determine a temporal complexity value of second recommended software components;
   rank the first recommended software component based on a weighted sum of associated partial cost values determined using the temporal complexity value, when an input vector of the instruction-to-vector model is received by the sequence-to-sequence model, the first recommended software component to be ranked against the second recommended software components based on a comparison of partial cost values corresponding to respective ones of the second recommended software components, the temporal complexity value of the second recommended software components compared to a quartic order polynomial;
   detect vulnerabilities based on an attack surface of a portion of the first recommended software component and the second recommended software components when the temporal complexity value of the second recommended software component is lower than the quartic order polynomial; and
   output a ranking of the first recommended software component and the second recommended software component, the ranking based on the temporal complexity values and the vulnerabilities.

2. The apparatus of claim 1, wherein the processor circuitry is to encode at least one of a new function specification, a list of input arguments, or a list of return argument types.

3. The apparatus of claim 2, wherein the processor circuitry is to receive as input at least one of the encoded new function specification or the current state representation using an instruction predictor, the instruction predictor including the sequence-to-sequence (seq2seq) model, the seq2seq model further including teacher forcing.

4. The apparatus of claim 3, wherein the seq2seq model includes semi-supervised learning.

5. The apparatus of claim 3, wherein the instruction-to-vector (inst2vec) model is to provide an input vector representative of the current state of the function.

6. The apparatus of claim 5, wherein at least one of the instruction-to-vector (inst2vec) model or the seq2seq model is trained offline using the network reachable software program corpus.

7. The apparatus of claim 2, wherein the new function specification is at least one of a functional description, a list of input arguments, or a list of output values.

8. The apparatus of claim 7, wherein the processor circuitry is to perform one-hot encoding of the new function specification, the one-hot encoding including unsupervised learning.

9. The apparatus of claim 1, wherein the processor circuitry is to classify the vulnerabilities using a recurrent neural network.

10. The apparatus of claim 1, wherein the processor circuitry is to perform risk scoring using a vulnerability classifier, the vulnerability classifier pre-trained using at least one of a common vulnerability exposure (CVE) database or a Juliet test suite.

11. The apparatus of claim 1, wherein the processor circuitry is to implement a neural network as a generative adversarial network (GAN).

12. The apparatus of claim 11, wherein the processor circuitry is to perform risk scoring, the risk scoring including at least one of a number of inputs that can exploit a software code, a number of epochs to finish training the neural network, or a total number of generated inputs.

13. The apparatus of claim 1, wherein the recommended software component includes at least one of a routine, a module, or a library.

14. A computer-implemented method for software development, the method comprising:
   generating, by executing an instruction with at least one processor, a representation of a current state of a function based on an instruction-to-vector model, the instruction-to-vector model trained using a network reachable corpus of software programs;
   generating, by executing an instruction with the at least one processor, a first recommended software component based on the current state of the function using a sequence-to-sequence model, the network reachable corpus used to train the sequence-to-sequence model;
   determining, by executing an instruction with the at least one processor, a temporal complexity value of second recommended software components;
   ranking, by executing an instruction with the at least one processor, the first recommended software component based on a weighted sum of associated partial cost values determined using the temporal complexity value, when an input vector of the instruction-to-vector model is received by the sequence-to-sequence model, the first recommended software component ranked against the second recommended software components based on a comparison of partial cost values corresponding to respective ones of the second recommended software components, the temporal complexity value of the second recommended software components compared to a quartic order polynomial;
   detecting, by executing an instruction with the at least one processor, vulnerabilities based on an attack surface of a portion of the first recommended software component and the second recommended software components when the temporal complexity value of the second recommended software components is lower than the quartic order polynomial; and output a ranking of the first recommended software component and the second recommended software component, the ranking based on the temporal complexity values and the vulnerabilities.

15. The method of claim 14, further including encoding at least one of a new function specification, a list of input arguments, or a list of return argument types.

16. The method of claim 14, further including classifying the vulnerabilities using a recurrent neural network.

17. A non-transitory computer readable storage medium comprising computer readable instructions that, when executed, cause one or more processors to, at least:

generate a representation of a current state of a function based on an instruction-to-vector model, the instruction-to-vector model trained using a network reachable corpus of software programs;

generate a first recommended software component based on the current state of the function using a sequence-to-sequence model, the network reachable corpus used to train the sequence-to-sequence model;

determine a temporal complexity value of second recommended software components;

rank the first recommended software component based on a weighted sum of associated partial cost values determined using the temporal complexity value, when an input vector of the instruction-to-vector model is received by the sequence-to-sequence model, the first recommended software component to be ranked against the second recommended software components based on a comparison of partial cost values corresponding to respective ones of the second recommended software components, the temporal complexity value of the second recommended software components compared to a quartic order polynomial;

detect vulnerabilities based on an attack surface of a portion of the first recommended software component and the second recommended software components when the temporal complexity value of the second recommended software components is lower than the quartic order polynomial; and output a ranking of the first recommended software component and the second recommended software component, the ranking based on the temporal complexity values and the vulnerabilities.

18. The storage medium of claim 17, wherein the instructions, when executed, further cause the one or more processor to iterate through a process of receiving a new function specification input and the current state representation input until the new function is complete.

19. The storage medium of claim 17, wherein the instructions, when executed, further cause the one or more processors to initialize the current state representation as empty before a first recommended software component is generated.

20. The storage medium of claim 17, wherein the instructions, when executed, further cause the one or more processors to rank the software component if the software component is within a suggestible search space, the suggestible search space determined using a binary switch.

21. The storage medium of claim 17, wherein the instructions, when executed, further cause the one or more processors to calculate a complexity cost function for a software component using at least one of the temporal complexity, a spatial complexity, a transactional behavior, or a tenancy behavior.

\* \* \* \* \*